March 1, 1938.  N. F. MATTESON ET AL  2,109,499
AUTOMATIC CHANGE-OVER
Filed July 7, 1937  3 Sheets-Sheet 1
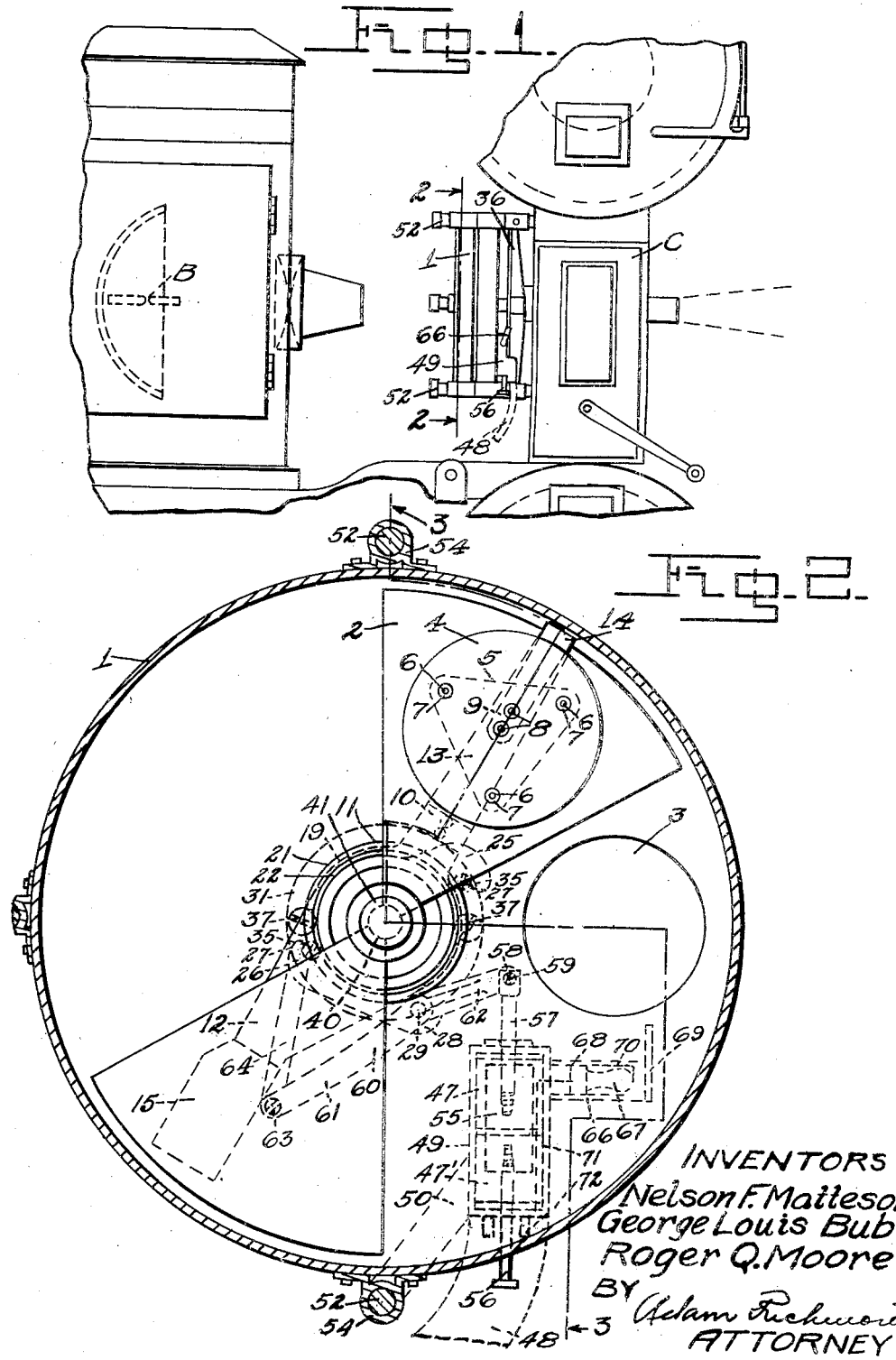
INVENTORS
Nelson F. Matteson
George Louis Bub
Roger Q. Moore
BY Adam Richmond
ATTORNEY

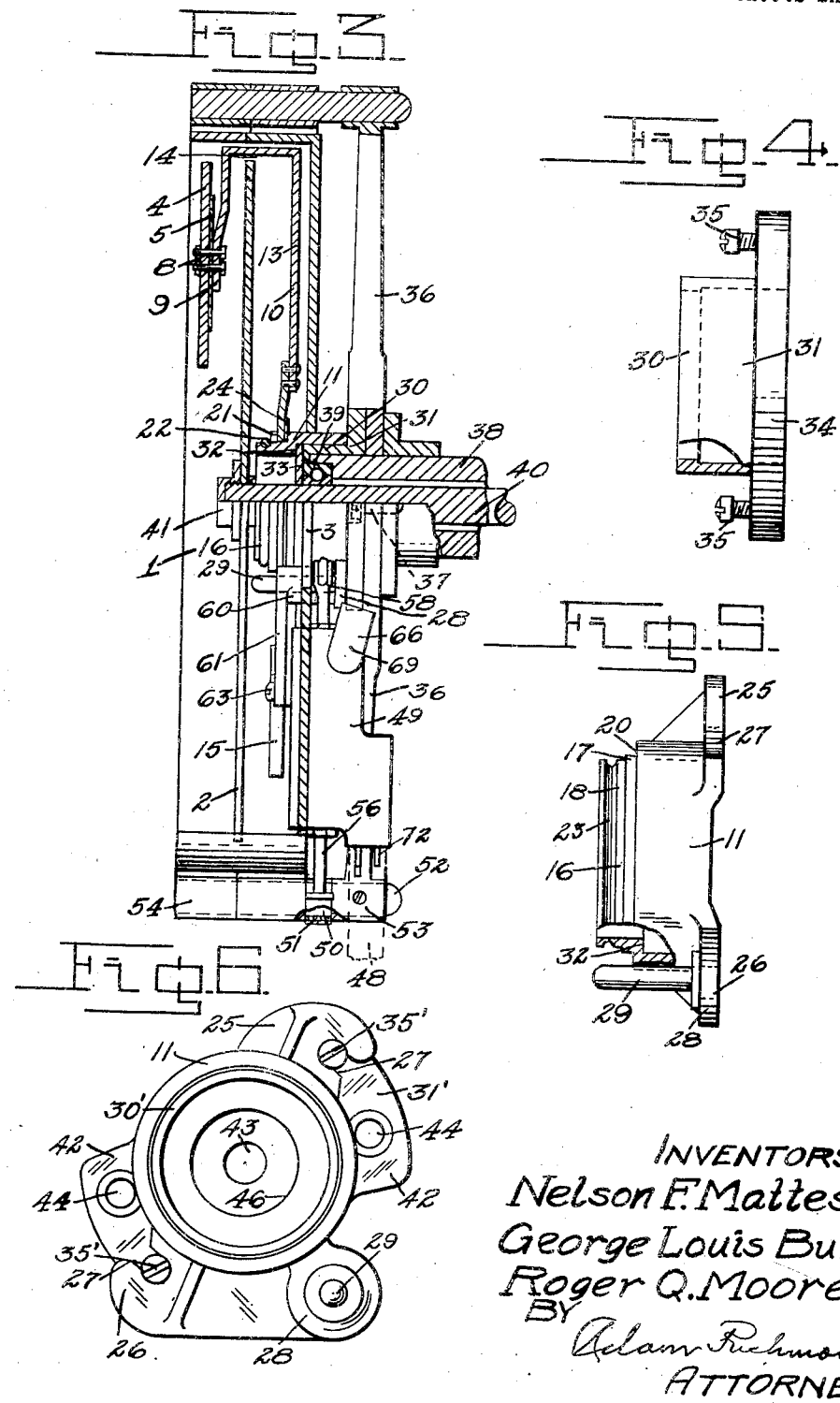

March 1, 1938.  N. F. MATTESON ET AL  2,109,499

AUTOMATIC CHANGE-OVER

Filed July 7, 1937  3 Sheets-Sheet 3

INVENTORS
Nelson F. Matteson
George Louis Bub
Roger Q. Moore
BY
Adam Richmond
Attorney Patented Mar. 1, 1938

2,109,499

UNITED STATES PATENT OFFICE

2,109,499

AUTOMATIC CHANGE-OVER

Nelson F. Matteson, Washington, D. C., and George Louis Bub and Roger Q. Moore, St. Louis, Mo.

Application July 7, 1937, Serial No. 152,390

10 Claims. (Cl. 88—19.3)

(Granted under the act of March 3, 1883, as amended April 30, 1928; 370 O. G. 757)

This invention described herein may be manufactured and used by or for the Government for governmental purposes, without the payment to us of any royalty thereon.

This invention relates to an automatic douser or change-over device for obstructing and unobstructing the light beam of motion picture projectors; more particularly it is directed to a device of this character to be used in pairs, one of the devices being adapted to cover the projecting light opening in one of a pair of motion picture projectors, while the other of the devices simultaneously uncovers the light opening in the other projector.

The principal object of the invention is to provide an automatic douser for opening and closing the light passage of a motion picture projector which is of such construction that the douser, together with a part of its operating mechanism may be installed within the confines of the conventional shutter casing of the projector.

Another object of the invention is to provide a douser for automatically opening and closing the light opening of a motion picture projector, which operates between a shutter and the light source of the projector.

Another object of the invention is to provide a douser of this type which is simple in construction, easy to install within a conventional shutter casing of the projector and dependable in operation.

With the above and other objects and advantages in view, the invention consists in features of construction and arrangement and operation of parts, which will hereinafter appear.

For purposes of illustration the invention will be described and claimed with reference to the accompanying drawings in which like parts distinguish like members and in which—

Fig. 1 is a fragmentary side elevation of a motion picture projecting apparatus including the usual flicker shutter casing in which the improved douser and a part of its operating mechanism is installed;

Fig. 2 is a cross-sectional view of the shutter casing taken on the line 2—2 of Fig. 1;

Fig. 3 is a longitudinal sectional view taken on the line 3—3 of Fig. 2;

Fig. 4 is a side elevation partly in section of a bearing member for the douser hub or mount;

Fig. 5 is a side elevation, partly in section, of the douser mount shown in Fig. 3;

Fig. 6 is a front elevation of the mount, but showing a modified form of bearing member and illustrating the manner of securing the mount thereon.

Figure 7:
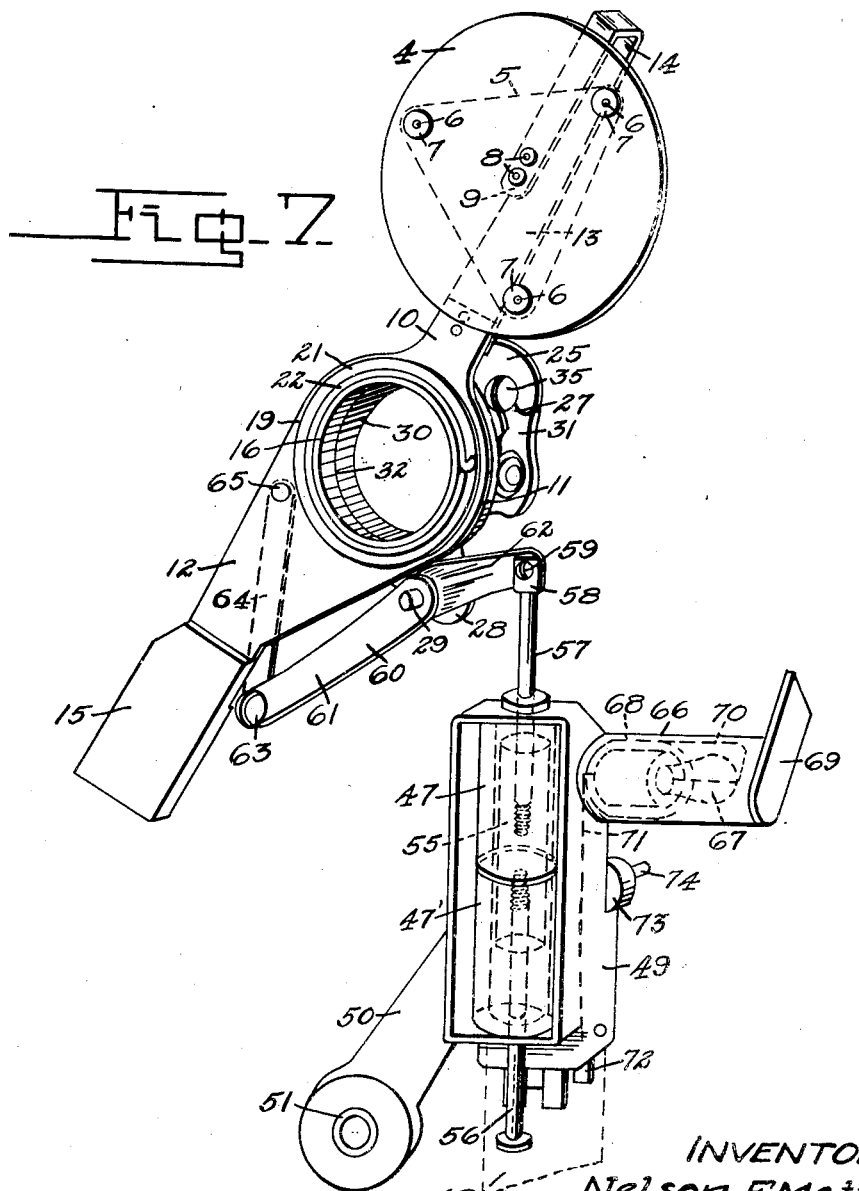
Fig. 7 is a perspective view of the improved automatic douser and its operating mechanism.

In the illustrated embodiment characterizing the invention, there is shown a conventional shutter casing (1) having a flicker shutter (2), rotatably mounted therein and in which the improved douser is adapted to be operated for opening and closing the light passage (3) in the shutter casing. The improved douser comprises a light obstructing member (4) in the form of a disc made of any suitable heat resisting material such as asbestos or the like and secured to a triangular shaped metal bracket (5) by means of rivets (6) and washers (7). The bracket (5) is, in turn, secured by bolts (8) to the outer end (9) of a douser operating and supporting arm (10) which is supported for oscillating movement on a hub or mount (11). The arm (10) has a radially extending end portion (12) which is shorter than the supporting portion (13) thereof. The supporting portion (13) extends radially outwardly from the mount (11) opposite from the shorter end portion (12) on one side of the shutter (2) adjacent to the inner circumferential surface of the shutter casing (1), where it is bent radially back on the other side of the shutter, forming a U-shaped portion (14) which clears the outer periphery of the shutter, as illustrated in Fig. 3. The shutter (2) is thus adapted to rotate between the supporting arm (10) and the disc (4) which is secured to the free end (9) of the supporting arm as hereinbefore described.

The disc (4) operates in a plane located between the light source B of the projector C, and the shutter (2) and is so arranged on the supporting arm (10) as to register with and cover the light passage or opening (3) in the shutter casing (1) when it is in operated position.

The outer end of the shorter and oppositely extending portion (12) of the supporting arm (10) is provided with a counterweight (15) which is made of such weight as will balance the supporting arm and its associated mechanism to be hereinafter described.

The mount (11) on which the improved douser is pivotally mounted is in the form of a cylindrical casting having a reduced end portion (16) which is in turn provided with reduced cylindrical portions (17) and (18), as illustrated in Fig. 5. The reduced portion (17) provides a bearing surface for the supporting arm (10) of the douser which has an opening (19) fitting on said reduced portion (16) and engages a shoulder (20) provided by the said reduced portion. A retaining washer (21) and a snap spring (22) in a groove (23) around the portion (16) holds the arm assembled on the mount. A spring tension washer (24) is interposed between the supporting arm (10) and the shoulder (20) provided on the mount (11). The supporting arm (10) is adapted to rotate or oscillate freely on the mount (11), the spring tension washer (24) being so formed as to provide sufficient frictional resistance to retain the douser arm and the disc (4) in the desired position, whether operated to close the light passage or opening (3) or to open the same.

The mount (11) is also provided with two oppositely disposed radially projecting lugs (25) and (26) which are cast integral with the mount as illustrated in Figs. 5 and 6. Each of the lugs (25) and (26) is provided with an arcuate shaped notch (27) entering from one radial edge of each lug for a purpose which will hereinafter appear. The chordal length of the lug (26) is slightly greater than that of the lug (25) and presents an ear (28) in which is mounted a pivot pin (29) which extends horizontally outwardly from the ear (28) and parallel with the axis of the mount (11), terminating adjacent to the reduced portion (16) thereof. The mount (11) is adapted to be supported concentrically on the casing on the opposite or rear side of the shutter from said light source and to fit freely over an outwardly extending cylindrical bearing portion (30) of a bearing housing (31), as illustrated in Figs. 3 and 4, with the outer edge of the projecting portion of the bearing housing fitting against a shoulder (32) within the mount. A washer (33) is introduced between the outer edge of the projecting portion (30) of the bearing housing and the shoulder (32) of the mount. The bearing housing (31) is provided with a flange portion (34) having screws (35) provided thereon which are adapted to be engaged by the notches (27) of the mount (11) for retaining the mount assembled on the bearing housing. The bearing housing (31) is secured to the casing support bracket (36) of the projector by means of screws (37) and is adapted to fit over the outer end of a shutter shaft bracket (38) which is reduced in diameter on the interior thereof, whereby a space is provided for accommodating a ball bearing (39) which supports the rear end of a centrally located shutter shaft (40) having the shutter (2) secured to the outer end thereof by means of a retaining nut (41), the inner end of the shutter shaft (40) being connected to the usual shutter driving and adjusting mechanism (not shown).

A modified form of bearing housing (31') as illustrated in Fig. 6, may be employed in place of the bearing housing (31), the said bearing housing (31') comprising an annular projecting portion or hub (30') having oppositely extending ears (42) integrally formed on the rear end thereof. The rear end of the bearing housing (31') is closed except for an opening (43) to accommodate the shutter shaft (40) which extends therethrough. The ears (42) of the bearing housing (31') are provided with holes (44) to receive screws for securing it to the casing support bracket. It also has threaded holes for the screws (35') which secures the mount in place. The interior of the bearing housing (31') is provided with a reduced portion (46) adapted to receive the ball bearing (39).

The douser is automatically operated to open and close the light passageways (3) of the shutter casing (1), by means of a pair of aligned electromagnetic coils (47) and (47') which are energized by any suitable source of electrical energy (not shown) through the conductor (48). The electro-magnetic coils (47) and (47') are enclosed within a housing (49) having an angular arm (50) provided thereon in the end of which is loosely carried a bushing (51) which is adapted to engage the supporting rod (52) which supports casing (1) by means of a casing support (54). The bushing (51) is clamped between the lower arm (53) of the casing support bracket (36) and the casing support (54), thus permitting the housing arm (50) to rotate slightly upon the bushing (51) for a purpose which will hereinafter appear. The electromagnetic coils (47) and (47') are adapted to actuate a freely moving armature (55) which is connected at its lower end to a hand operated rod (56) and at its upper end to a connecting rod (57) that terminates in a bifurcated end (58). The bifurcated end (58) of the connecting rod (57) is pivotally secured by a screw (59) to one end of a lever (60) which is asymmetrically pivoted on the pin (29) in the ear of the mount (28), whereby a short and long arm portion (61) and (62) is provided on the lever. The longer arm portion (61) of the lever is pivoted at (63) to one end of a link (64) which is, in turn, pivoted at (65) to the short portion (12) of the douser supporting arm (10).

The coil housing (49) of the electro-magnets (47) and (47') is combined with a framing lamp mount and housing (66) having a framing lamp (67) together with a tubular shield (68), therefor, on the end of which is detachably secured a projecting light shield (69) to protect the eyes of the projectionist against direct rays of the framing light, said rays passing out through an opening (70). The central conductor (71) of the framing light is carried to one of a series of contacts as at (72) while the outer shell of the lamp is grounded into the coil housing (49) due to the fact that its socket is screwed directly into this housing. The projection (73) with its associated pin (74) is provided for holding the coil housing assembly in vertical position during the operation of assembling this device on the projector and prior to the final operation of inserting the screw (59) on the upper end of the connecting rod (57) in place.

Ordinarily the above described douser or change-over device is used in pairs, one being installed within the shutter casing of each motion picture projector. It will be readily understood that the magnetic coils (47) and (47') should be so connected electrically that the upper coil (47), of one device and the lower coil (47') of the other, are in series and are energized by use of one switch while the lower coil of the one and the upper coil of the other device are in a different series circuit and remain unenergized during the operation of the coils in the first mentioned circuit. This arrangement of coils is well known in the art and requires no illustration.

In the operation of the device, assuming that the douser has been operated to close the light passage or opening (3) provided in shutter casing (1) and the magnetic coil (47) has been energized, the armature (55) will be pulled upwardly which, in turn, moves the connecting rod (57) upwardly to rotate the lever (60) about its pivot (29), which pulls down on the link (64) and rotates the supporting arm (10) about its pivot, whereby the douser is actuated to remove the disc (4) out of register with the light passage (3). Should the upper magnetic coil (47) be deenergized and the lower magnetic coil (47') be energized, the armature (55) would be drawn downwardly, thus reversing the above described operation to bring the douser disc down into register with the light passage (3).

It will thus be seen from the above description of the invention that an improved douser or change-over device is provided for automatically covering and uncovering the light openings for motion picture projectors, which is of such construction that it may be readily installed within the shutter casing of the projector, thereby permitting proper positioning of the light source of the projector with respect to the film aperture thereof and eliminating the possibility of the shutter being damaged. Also by combining the coil housing containing the magnetic coils with the framing lamp mount and housing, only one electrical conduit is necessary for supplying the electrical energy to the magnetic coils and framing lamp. Even though we have herein shown and described the invention as comprising certain details of construction, it is nevertheless to be understood that various changes may be made therein without departing from the spirit or scope of the invention.

Having described our invention, what we claim as new and wish to secure by Letters Patent is:

1. In combination with a projector of the type described having a shutter casing and a shutter casing support provided thereon, a douser within the shutter casing, a supporting arm for the douser, a mount carrying the supporting arm and a bearing member for the mount carried by the shutter casing support said mount having slotted lugs provided thereon and said bearing member having screws whereby said mount may be detachably secured to said bearing member.

2. In combination with a projector of the type described having a shutter casing and a shutter casing support provided thereon, a douser within the shutter casing, a supporting arm for the douser, a mount carrying the supporting arm, a bearing member for the mount carried by the shutter casing support, said mount having slotted lugs and an ear provided thereon, screws on said bearing member adapted to engage the slotted lugs of said mount for detachably securing the mount to said bearing member, an operating lever pivoted to the ear of said mount, a link connecting the lever to the supporting arm and operating means connected to said lever.

3. In combination with a projector of the type described having a shutter casing and a shutter casing support provided thereon, a douser within the shutter casing, a supporting arm for the douser, a mount carrying the supporting arm, a bearing member for the mount carried by the shutter casing support, said mount having slotted lugs and an ear provided thereon, screws on said bearing member adapted to engage the slotted lugs of said mount for detachably securing the mount to said bearing member, an operating lever pivoted to the ear of said mount, a link connecting the lever to the supporting arm, a pair of electro-magnets, an armature actuated by said electro-magnets, a rod on said armature, said rod connected to said lever for operation thereof, a housing for said electro-magnets mounted on said shutter casing, and a bracket for supporting said housing on said shutter casing.

4. In combination with a projector of the type described having a shutter casing and a shutter casing support provided thereon, a douser within the shutter casing, a supporting arm for the douser, a mount carrying the supporting arm, a bearing member for the mount carried by the shutter casing support, said mount having slotted lugs and an ear provided thereon, screws on said bearing member adapted to engage the slotted lugs of said mount for detachably securing the mount to said bearing member, an operating lever pivoted to the ear of said mount, a link connecting the lever to the supporting arm, a pair of electro-magnets, an armature actuated by said electro-magnets, a rod on said armature, said rod connected to said lever for operation thereof, a housing for said electro-magnets mounted on said shutter casing, a bracket for supporting said housing on said shutter casing and a framing lamp housing on said electro-magnet housing.

5. In combination with a projector of the type described including a light source and having a shutter casing and a shutter casing support provided thereon, a shutter and a douser within the shutter casing, said douser operatively positioned between the plane of said shutter and said light source, means on the opposite side of the plane of said shutter from said light source for operating said douser and means connecting said douser to said operating means.

6. In combination with a projector of the type described including a light source and having a shutter casing and a shutter casing support provided thereon, a shutter within the shutter casing, said light source positioned in front of said shutter, a bearing member at the rear of said shutter remote from said light source, a mount on said bearing member, a douser operatively positioned between said light source and said shutter, an arm carried by said mount and connected to said douser for supporting said douser between the light source and said shutter, and means for operating said douser through said arm.

7. In combination with a projector of the type described including a light source and having a shutter casing and a shutter casing support provided thereon, a shutter within the shutter casing, said light source positioned in front of said shutter, a bearing member at the rear of said shutter remote from said light source, a mount on said bearing member, a douser operatively positioned between said light source and said shutter, an arm for supporting said douser, said arm carried by said mount and extending radially outwardly therefrom on the opposite side of said shutter from said light source, thence beyond the outer periphery of said shutter, thence across said shutter and thence radially downward on the other side of said shutter, and means for operating said douser through said arm.

8. In combination with a projector of the type described including a light source and having a shutter casing and a shutter casing support provided thereon, a shutter and a douser within the shutter casing, said light source positioned in front of said shutter and said douser operatively positioned between said shutter and said light source, means at the rear of said shutter remote from said light source for operating said douser and means connecting said douser to said means for operating the douser.

9. In combination with a projector of the type described including a light source and having a shutter casing and a shutter casing support provided thereon, a shutter operatively supported within said shutter casing, said light source positioned in front of said shutter, a douser operatively positioned between said light source and said shutter, a supporting arm for said douser, said supporting arm connected to said douser and concentrically mounted on said shutter casing on the opposite side of said shutter from said light source and means for operating said douser.

10. In combination with a projector of the type described including a light source and having a shutter casing and a shutter casing support provided thereon, a shutter operatively supported within said shutter casing, said light source positioned in front of said shutter, a douser operatively positioned between said light source and said shutter, a mount supported concentrically on said casing on the rear of said shutter remote from said light source, a supporting arm for said douser carried by said mount and means for operating said douser.

NELSON F. MATTESON.
GEORGE LOUIS BUB.
ROGER Q. MOORE.